United States Patent Office 3,115,411
Patented Dec. 24, 1963

3,115,411
ISOLATING A LICHENIN-CONTAINING CONSTITUENT FROM DEHULLED BARLEY GRAIN
Harold L. Shields, Cuyahoga Falls, Ohio, assignor to The Quaker Oats Company, Chicago, Ill., a corporation of New Jersey
Filed Dec. 19, 1958, Ser. No. 781,695
4 Claims. (Cl. 99—93)

The present invention relates to production of a special product from the cereal grain barley. More particularly, the invention relates to a method for isolating a constituent considered to be lichenin-containing from kernels of barley.

Lichenin is a gelatinous polysaccharide, $(C_6H_{10}O_5)_x$ naturally occurring in certain mosses, bulbs and cereal grains. Lichenin or lichenin-containing product constituents may be used, for example, as ingredients in food or pharmaceutical products to provide viscous, emulsified, thickened or stabilized aqueous or liquid compositions having desirable physical properties.

In this art, it has long been considered that isolating lichenin or lichenin-containing constituents from kernels of barley was not feasible or commercially practicable. The prior art attempts to isolate lichenin-containing constituents from barley have resulted in products which were either subject to rapid deterioration or loss of desirable properties when mixed with water or other liquids, or else were adulterated by hull residue, a relatively high starch content, a relatively high protein content and other contaminants.

The present invention is intended to provide a method for isolating a product constituent occurring in kernels of barley. More specifically, the invention is intended to provide a method for isolating a lichenin-containing or lichenin-like constituent from kernels of barley which has emulsifying, thickening or stabilizing properties when mixed with water or similar liquids.

It is a further object of the invention to provide a method which can be practiced to produce a lichenin-containing constituent from barley kernels in commercial quantities and at competitive prices.

These and other objects of the invention, as well as the nature and advantages thereof, will be apparent in view of the following detailed disclosure taken in conjunction with the attached drawings.

The process of the invention, whereby a special product constituent such as lichenin is isolated in commercial quantities from kernels of barley, preferably begins with dehulled grain. The dehulled grain kernels are treated as by steaming to deactivate other barley constituents, such as lichenin-destroying enzymes, capable of altering the molecular structure of the product constituent. The treated kernels are then flaked and ground until a substantial portion thereof is reduced to a very fine particle size, with discrete starch and non-starch particles. The coarser non-starch particles, which include the product constituent, and the finer starch particles are then preferably screened and the non-starch particles introduced or dropped into a confined or vertical stream of air or similar fluid whereby a separation occurs according to the average sphericity factor of the particles, those particles having the lower average sphericity factor being predominantly the product constituent.

Figure 1:
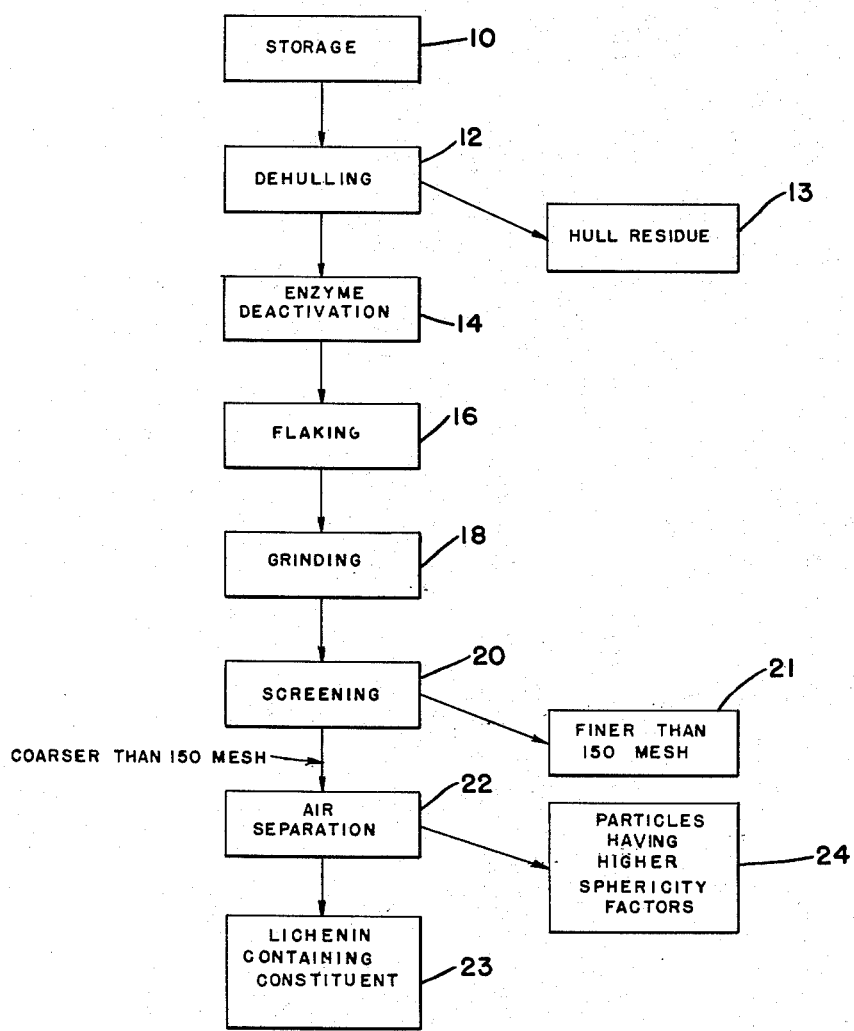
FIG. 1 is a schematic diagram showing a representative flow for the processing of barley according to the invention.

Referring to FIG. 1, the flow of barley grain according to the invention begins with preferably clean grain from storage or elevator facilities indicated at 10. The barley kernels are then dehulled by the use of conventional equipment indicated at 12. The equipment 12 may be milling stones, decorticators, or pearling devices.

The hull residue collected at 13 is primarily cellulosic in character, having value as an ingredient in animal feeds, polishing abrasives, as a filler for plastics, or as a starting material for the production of certain organic chemicals.

The dehulled barley kernels are then treated in equipment indicated at 14 to destroy or deactivate lichenase or lichenin-destroying enzymes in the kernels. The equipment 14 may be a groat steamer, employing steam at atmospheric or slightly greater pressure. The equipment 14 could also be a pressurized cooker which has the advantage of reducing the time required for the enzyme deactivation step. The lichenin-destroying enzymes could also be deactivated chemically, as by prolonged exposure in an atmosphere containing ethylene oxide or hydrogen cyanide gas.

Using a groat steamer having a capacity of 700 lbs. per batch, a steaming time of from 6-8 minutes at 212°-225° F. has been found sufficient to deactivate lichenin-destroying enzymes in dehulled barley.

The enzyme deactivated kernels are next rolled or flaked in equipment indicated at 16. After steaming, the steamed kernels may be carried to the equipment 16 by conveying means (not shown) which will permit drip drainage of excess moisture attributable to condensed steam. It is preferred that the kernels be neither soaking wet nor so dry that the kernels would be shattered by the equipment 16. The moisture content of each kernel should be such (e.g. about 15% by weight) that the equipment 16 will flatten the steamed kernels to a laminar flake form as shown in FIG. 2, having an average thickness of about 0.030 of an inch.

The equipment 16 may be flaking rolls, such as those manufactured by Allis-Chalmers, Lauhoff, and other machinery concerns.

Figure 2:
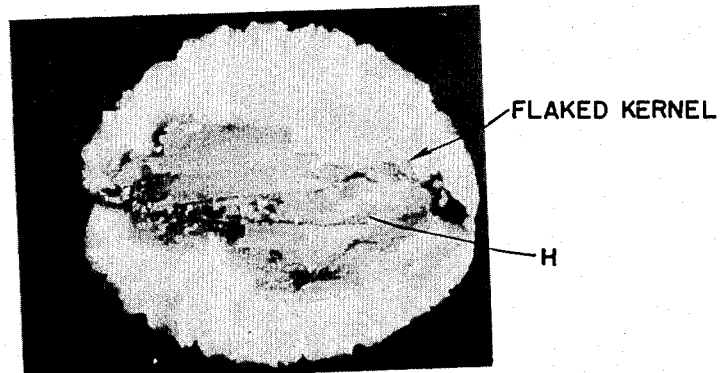
FIG. 2 is a reproduction of a photomicrograph of an individual barley grain kernel after the step of flaking, magnified about 10 times.

Referring to FIG. 2, the flaking or rolling operation flattens the kernels to a flake form in which the several constituent layers are in essentially laminar relation. The fragments of hull not removed by the equipment 12 are indicated at H. The light portions of the flaked kernels include the outer bran (B), aleurone (A), the starchy endosperm (S) and the perisperm considered to contain predominant amounts of lichenin or lichenin-like constituents (LC).

The laminar kernel flakes are next ground or pulverized in equipment indicated at 18. The equipment 18 may be an impact grinder, such as manufactured by Pulverizing Machinery Division of Metal Disintegrating Corp., incorporating suitable classifying means to retain the material within the grinding zone until the desired granulation is achieved.

The grinding operation in equipment 18 is intended to achieve substantial detachment and freeing of the several constituent layers (A, B and S) from each other and from the lichenin-containing layer (LC). It is necessary that the grinding be carried on until the laminar layers are pulverized or shattered into discrete particles of small size.

In practice, it has been found that discrete particles of small size are produced if the equipment 18 is adjusted so that at least 95% by weight of the feed passes through a 70 mesh size testing sieve, at least 50% by weight of the minus 70 mesh material passes through a 150 mesh size testing sieve and at least 80% of the minus 150 mesh material passes through a 200 mesh testing sieve. These values are exemplary only and may vary according to the condition and type of grinding equipment employed.

The ground kernel particles are preferably then screened in equipment indicated at 20. The equipment 20 may be conventional bolting apparatus having vibrating multi-tiered sifting screens, preferably by 150 mesh size.

Figure 3:
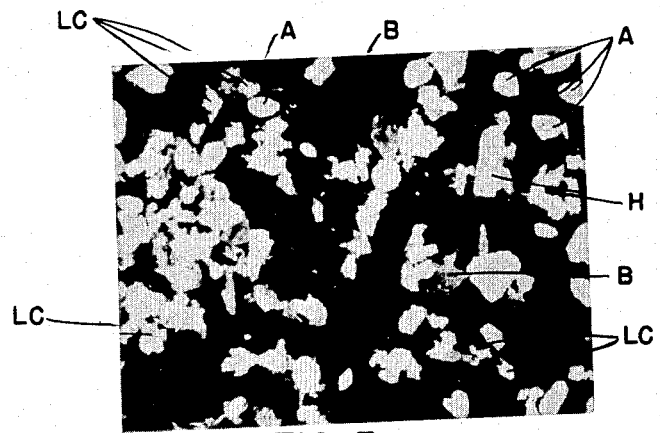
FIG. 3 is a reproduction of a photomicrograph of a sample taken after screening, showing the collected coarse fraction magnified about 33 times.

The material passing over the screens in equipment 20 is relatively starch free, consisting principally of a mixture of outer bran, aleurone and perisperm particles. FIG. 3 shows a sample of plus 150 mesh size material, representative B, H, A and LC particles being indicated.

Figure 4:
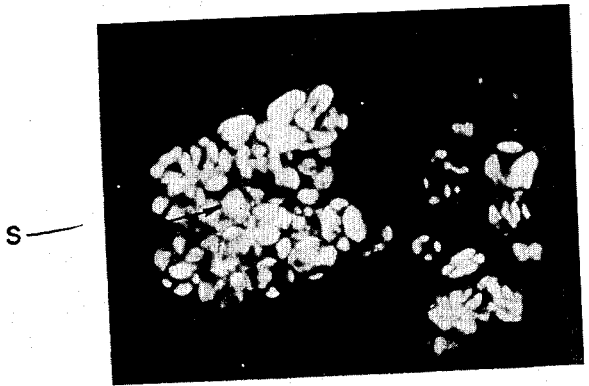
FIG. 4 is a reproduction of a photomicrograph of a "wet" sample also taken after screening, showing the fine fraction magnified about 400 times and under polarized light.

The material passing through the screens in equipment 20 consists principally of starchy endosperm (S) as shown by the characteristic appearance of the particles in FIG. 4. Referring to FIG. 1, the minus 150 mesh fraction is collected at 21 and has value as a food ingredient.

Referring to FIG. 3, the lichenin-containing constituent particles LC are primarily two dimensional, substantially in the form of flat plates which are wavy or curled, a physical form characterized by a high ratio of surface area to weight or density. The outer bran layer particles B, the lesser amounts of hull residue H and the aleurone layer particles A are primarily three-dimensional, substantially in the form of cubes or similarly shaped particles, having a physical form characterized by a lower ratio of surface area to weight or density. The coarser than 150 mesh fraction is further characterized by the absence of significant amounts of starchy endosperm particles S which constitute the major portion of the finer than 150 mesh fractions collected at 21 (see FIG. 4).

Because the particles seen in FIG. 3 are physically similar in that they have the same average width and length, two dimensions in common, prior art techniques such as screening, with or without air lifting or aspirating, have not been entirely successful in isolating an LC fraction in a commercial operation. The particles also have sufficient common identity with respect to empirical or qualitative chemical composition as to render a separation by solvent extraction means costly and difficult.

Figure 7:
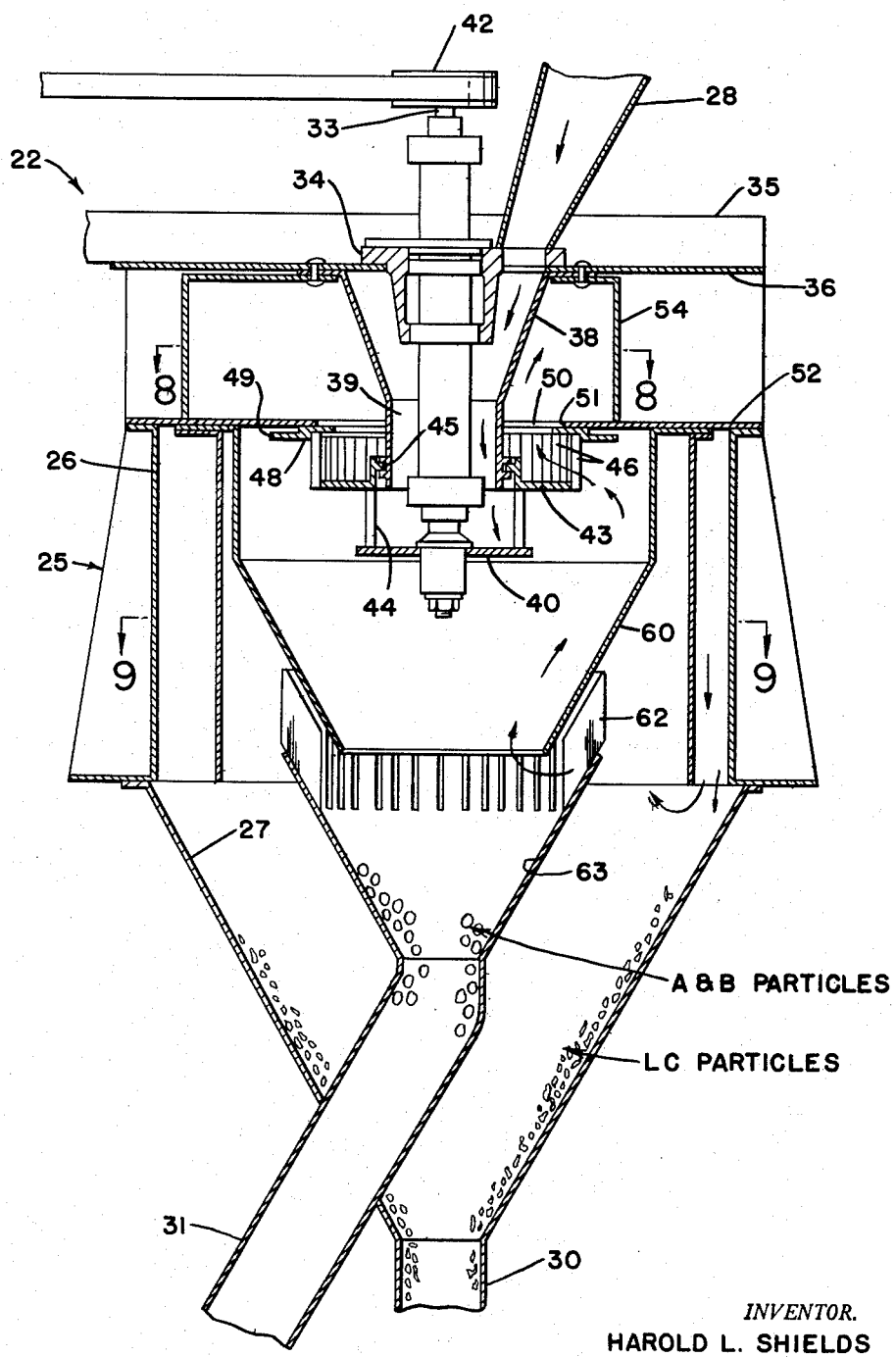
FIG. 7 is a schematic cross section in elevation of one type of air separation equipment suitable for practice of the invention.
Figure 8:
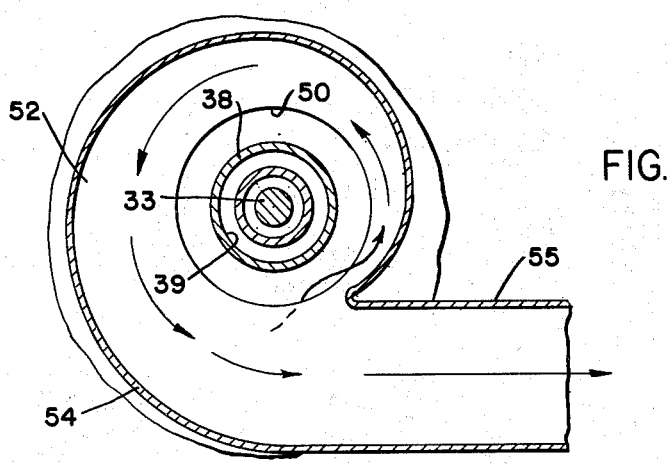
FIG. 8 is a plan section taken substantially as indicated on line 8—8 of FIG. 7.
Figure 9:
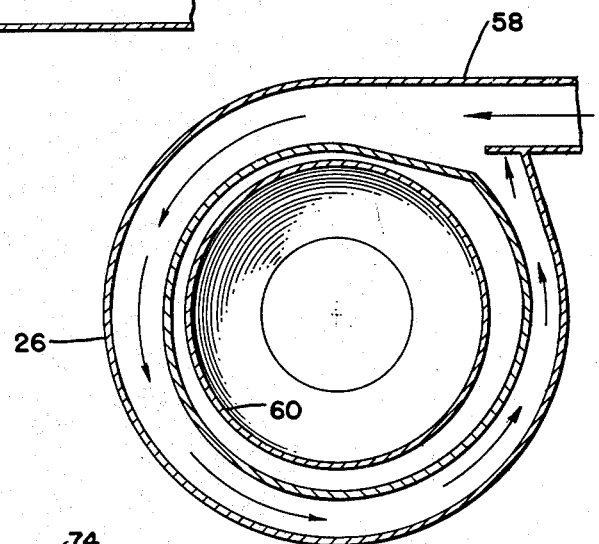
FIG. 9 is a plan section taken substantially as indicated on line 9—9 of FIG. 7.
Figure 10:
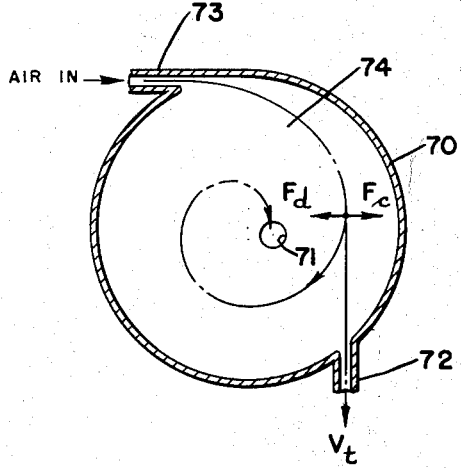
FIG. 10 is a schematic plan section of another type of air separation equipment suitable for practice of the invention.

The present invention contemplates isolation of the lichenin-containing constituents (see FIG. 6) in kernels of barley by introducing the coarser fraction collected at the screening equipment 20 into a confined stream of air provided by separator equipment indicated at 22. The equipment 22 may be a "Sturtevant Whirlwind centrifugal separator" such as shown in Pat. No. 2,790,550, Doyle et al., issued April 30, 1957. FIGS. 7–9 and the description below show representative details of this type of equipment. The equipment 22 could also be a "Sharples super classifier," also known as an optimal vortex classifier, such as shown in Pat. No. 2,616,563, Hebb, issued November 4, 1952. Reference is made to FIG. 10 and the description below for explanation of the operating principles thereof.

Separation of the LC particles from the aleurone A and outer bran B particles relies upon the physical fact that the rate at which fine particles (e.g. 150 microns) in a stream of air settle, under either the influence of gravity or of centrifugal force, varies with the size and shape of the particle. This principle is popularly referred to as Stoke's law.

Ordinarily, particles produced by grinding as with equipment 18 would be expected to show an almost infinite variety of shape and size. The literature relating to Stoke's law and air separation recognizes this and so speaks of the "average diameter" or "average size" of ground particles, compromise terms which are an approximation of geometric shape. If the barley kernels following use of the equipment 18 had a wide range of particle size or diameter, they would, of course, still behave according to Stoke's law. Yet, ground barley kernels having a wide range of particle size or diameter could not be satisfactorily separated into only two subfractions by use of the equipment 22.

When the several operative steps preceding use of the separator equipment 22 are carried out as described herein, the coarse fraction collected at the screening equipment 20 will consist of particles having a "median size or diameter" closely approximating the "average size or diameter." The particles can thus be introduced into a confined stream of air and insofar as their behavior in this respect is concerned, they would behave uniformly.

However, a separation of LC from A and B particles is obtained because even though the particles have similar geometric shapes, the several operative steps of the invention have produced particles having different hydrodynamic characteristics. The preceding steps provide a variable factor which so differs between LC particles on the one hand and A and B particles on the other hand, that an effective separation can be made.

The hydrodynamic characteristics of fine particles can be expressed in the terms "equivalent," "nominal" or "effective" diameter. These terms are an attempt to rationalize the infinitude of dimensions of an irregular particle and when calculated from a measured volume, the terms generally designate the diameter of a sphere of equal volume. The behavior of barley kernel particles in the equipment 22 can be expressed in these terms. However, it is considered that the behavior of barley kernel particles processed according to the invention can best be understood by use of the term "sphericity factor."

It has been calculated that the sphericities or sphericity factors of some common geometric figures are as follows:

Sphere _____ 1.000
Cube _____ 0.806
Prism:
    $a \times a \times 2a$ _____ 0.767
    $a \times 2a \times 2a$ _____ 0.761
    $a \times 2a \times 3a$ _____ 0.725
Disk:
    $h = r$ _____ 0.827
    $h = r/3$ _____ 0.594
    $h = r/10$ _____ 0.323
    $h = r/15$ _____ 0.220
Cylinders
    $h = 3r$ _____ 0.860
    $h = 10r$ _____ 0.691
    $h = 20r$ _____ 0.580

Figure 5:
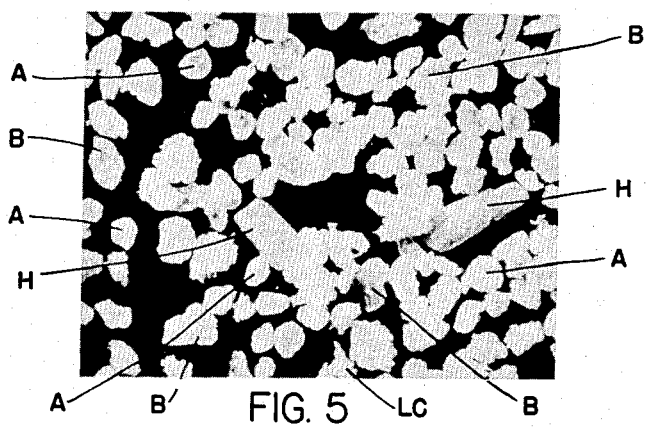
FIG. 5 is a reproduction of a photomicrograph of a sample taken after air separation, showing a subfraction having higher sphericity factors magnified about 33 times.
Figure 6:
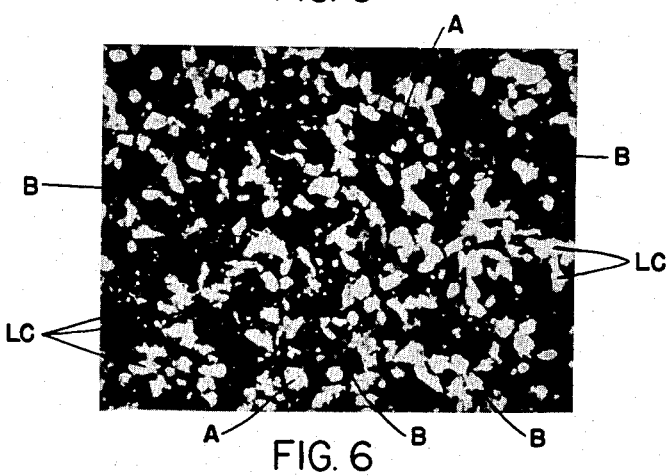
FIG. 6 is a reproduction of a photomicrograph also taken after air separation, showing a lichenin-containing constituent subfraction magnified about 33 times.

As best shown in FIG. 6, the lichenin-containing particles are primarily two-dimensional, wavy, plate-like or laminar. It has been found that the LC particles behave in a confined stream of air as though they had a low average sphericity factor, e.g., about 0.55 or less. As best shown in FIG. 5, the aleurone A and bran B particles are primarily three-dimensional and so behave in a confined stream of air as though they had a higher average sphericity factor, e.g., from about 0.80 to about 0.65.

FIG. 7 shows one type of air separation equipment 22 employing a confined stream of air and suitable for commercial practice of the invention. The apparatus of FIG. 7 employs a rapidly rotating distributor plate whirling about a vertical axis and arranged in a position such that collected fraction of LC, A and B particles from the screening equipment 20 may be fed by gravity onto the plate. Thereafter, the particles are acted upon by a combination of centrifugal forces and spiralling air currents to effect a separation of LC from A and B particles as a result of the difference in their respective sphericity factors.

The separator equipment has an outer casing 25 which includes an upper cylindrical section 26 and a lower conical ground section 27. Particles collected at the screening equipment 20 are introduced into the casing through a feed inlet 28 and the separated particles discharged from the casing through an axial outlet 30 for lower sphericity factor LC particles and a side outlet 31 for the higher sphericity factor A and B particles.

Vertically mounted within the casing 25 is a shaft 33 journaled in bearing means 34 mounted on a support beam 35 located at the top 36 of the casing 25. Suspended from the top 36 and surrounding the shaft 33 is a conical tubular member 38 for communicating with the inlet 28, thus defining an annular passage 39 for particles to pass from the feed inlet downwardly.

Fixed to the lower end of shaft 33 is a particle distributor plate 40 located directly below the annular passage 39 in a position to receive particles passing downwardly therefrom. This plate 40 is normally rotated about a vertical axis by means of a motor (not shown) and a belt driven pulley 42 secured at the upper end of shaft 33. The rate of speed of the distributor plate 40 is variable as required, and the higher sphericity factor A and B particles as shown in FIG. 5 are thrown off the distributor plate 40 dropping into a hopper 63 and discharging through outlet 31.

Spaced above the distributor plate 40 is a rejector blade ring member 43 supported on rods 44 attached to the plate 40. The ring member 43 rotates with plate 40 and has a sealing ring 45 seated in an annular groove on the lower end of tubular member 38. Vertically disposed around the ring 43 is a series of rejector blades 46 circumferentially spaced apart.

The blades 46 are secured at their upper ends to another ring element 48 having radially projecting extremities 49. The ring 48 at its upper side, communicates with an annular opening 50 defined by a recessed edge 51 formed in a separator plate 52. The edge 51 lies in spaced relation about the tubular member 38 and together with member 38 constitutes an annular passageway through which the lower sphericity factor LC particles which have passed through the rejector blades 46 must travel.

Referring also to FIG. 8, above the opening 50, a conduit consisting of a scroll shaped element 54 extends around the tubular element 38 in a spiral path to define a converging aperture communicating with opening 50 and closed at the top side. Element 54 is provided at one side with tubular opening 55 extending in a horizontal direction to one side of the casing 25 and leading directly into the suction of a fan (not shown) as indicated by the arrows in FIG. 8.

When the fan applies suction through opening 55, the scroll shaped element 54 results in an upwardly spiralling flow of air. With such an upwardly spiralling flow, a relatively low fan speed is employed to just overcome the downward pull of the rejector blades 46 and have a particle lifting effect of such limited intensity so as to primarily lift only the particles having a lower sphericity factor.

Referring to FIG. 9, from the fan connected with duct 55 in the upper casing 25, a return duct 58 connects with an opening in the housing 26. Thus, when the fan is driven, the air which has been moving in an upwardly spiralling direction is drawn through the exhaust duct 55 and recirculated through the duct 58 into the lower housing and around a tapered drum 60. This recirculated air carries with it the lower sphericity factor particles which have been passed through the rejector blades 46 and particles as shown in FIG. 6 are discharged in a downwardly directed stream around the sides of the casing sections 26 and 27 and finally out through the discharge outlet 30. The recirculating air passes through a series of baffle plates 62 surrounding the lower end of drum 60 and flows upwardly through the particles being thrown off the distributor blade 40 and dropping directly into the hopper 63.

FIG. 10 illustrates another type of air separation equipment 22 employing a confined stream of air and suitable for commercial practice of the invention. A cylindrical casing indicated at 70 has an inner discharge area 71 and a peripheral discharge area 72. Air enters as at 73, a centrifugal chamber 74 defined by the casing 70. The air flow begins at the outside diameter of chamber 74 and follows a spiral or vortex path as shown by the arrowed line, until it is discharged nearer the center of the chamber. Particles collected at the screening equipment 20 may be introduced into the chamber 74, at or near the center, above and baffled from area 71. When the particles are in the air flow, they acquire a tangential velocity ($V_t$) with each particle being subjected to a centrifugal force ($F_c$) tending to move it to the outside diameter of chamber 74. The centrifugal force on each particle is opposed by a drag force ($F_d$) induced by the radial inflow component of the air stream from opening 73.

It is thought that the centrifugal force on each particle varies with the cube of its diameter, while the drag force varies with the first power of its diameter. Thus, if the sphericity factor of a particle is high enough, centrifugal force will pull the particle outward. If the sphericity factor is low enough, the drag force will pull the particle inward towards the center. When the forces $F_c$ and $F_d$ are equal, the particle will move in a circular orbit. The equilibrium condition determines the cut point of the vortex type separator. Suitable dividing means (not shown) are employed at the cut point so that the LC particles are discharged through an opening at 71 and the A and B particles are discharged through an opening at 72.

Still other types of air separator equipment 22 providing a spiral or vortical confined stream of air for separating the LC particles from A and B particles are known. Reference is also made to Patent No. 2,694,492, Rumpf et al., issued November 16, 1954, which discloses various types of apparatus which could be adapted for use as air separator equipment 22.

As described above, the flaking equipment 16, grinding equipment 18, screening equipment 20 and separator equipment 22 are shown as distinct apparatus items, these being the best known forms of equipment now commercially available. Nevertheless, the invention contemplates the use of improved equipment; combining perhaps, flaking and grinding in one operation and screening and separating in the last operation. Therefore, practice of the invention with fewer items of equipment, but still employing the several process steps disclosed, should be considered as being within the scope of the invention.

*Example I*

In practice of the invention, approximately 1500 lbs. of cleaned barely was dehulled with mill stones and the husk material removed.

The dehulled barley, now weighing about 1000 lbs., was placed in a groat steamer and exposed to steam at a temperature of 220° F. for 7 minutes.

The barley kernels, slightly moist to the touch, were then passed through a set of Allis-Chalmers flaking rolls set at .030 of an inch (see FIG. 2). The flaked kernels were then passed once through a Mikro-Bud pulverizer to produce a finely ground material.

After grinding, 860 lbs. of material passed through a 150 mesh screen (see FIG. 4) and upon analysis was found to have the percentage composition—

| | |
|---|---|
| Moisture | 11.5 |
| Protein | 12.0 |
| Fat | 1.19 |
| Fiber | 0.87 |
| Ash | 1.24 |
| N.F.E. | 73.2 |

The coarser than 150 mesh fraction weighing 130 lbs. was passed through a centrifugal air separator, similar to that shown in FIGS. 7–9 and described above, having a distributing rotor 10 inches in diameter rotating at 870 r.p.m. The fine or product fraction (see FIG. 6) having the lower sphericity factors weighed 70 lbs. The coarse fraction (see FIG. 5) having the higher sphericity factors weighed 60 lbs.

Upon analysis, the fine or product fraction was found to have the percentage composition—

| | |
|---|---|
| Moisture | 11.3 |
| Protein | 11.7 |
| Fat | 2.06 |
| Fiber | 3.0 |
| Ash | 1.78 |
| N.F.E. | 70.2 |

Upon analysis, the coarse fraction was found to have the percentage composition—

| | |
|---|---|
| Moisture | 10.8 |
| Protein | 15.0 |
| Fat | 3.53 |
| Fiber | 4.77 |
| Ash | 3.99 |
| N.F.E. | 72.0 |

Ten (10) grams of the fine or product fraction 20 minutes after dispersion in 150 ml. of water at 120° F. gave a viscosity reading of 75 seconds when passed through a #5 Zahn viscometer. Ten (10) grams of the coarse fraction 20 minutes after dispersion in 150 ml. of water at 120° F. gave a viscosity reading of only 6 seconds when passed through a #5 Zahn viscometer.

Ten (10) grams of the minus 150 mesh fraction from the screening equipment 20 when dispersed for 20 minutes in 150 ml. of water at 120° F. gave a viscosity reading of 7 seconds when passed through a #5 Zahn viscometer.

As used herein, "barley" is intended to mean a grain of the grass family and the genus Hordeum. The method of the invention is particularly intended for the production of a special product from high-protein grain of the class Barley such as grown in the Midwest. However, the method is also considered applicable to the classes of Black Barley and Western Barley; and also "hull-less barley."

Practice of the present invention will isolate a constitutent considered to be lichenin-containing from kernels of barley; photomicrographs (FIG. 6), chemical analysis, and viscosity determinations are considered to indicate that the product fraction contains predominant amounts of lichenin or lichenin-like material.

What is claimed is:

1. A process for isolating a lichenin-containing constituent from kernels of dehulled barley grain, comprising the steps of:
   (a) treating said kernels to inactivate lichenen-destroying enzymes;
   (b) adding moisture so that the moisture content of each kernel is about 15% by weight;
   (c) rolling said moisturized kernels to a flake form having an average thickness of about .030 inch whereby the several constituent layers of said flakes are in essentially laminar relation;
   (d) impact grinding said flakes to small particle size with discrete starch and non-starch particles;
   (e) screening said discrete particles to separate coarser than 150 mesh size non-starch particles from finer than 150 mesh size starch particles; and
   (f) separating the coarser than 150 mesh size particles into two fractions according to average sphericity factors by introducing said coarser particles into a confined vortical stream of air, those particles having the lower average sphericity factors being the lichenin-containing constituent.

2. A process for isolating a lichenin-containing constituent from kernels of dehulled barley grain, comprising the steps of:
   (a) steaming said kernels to inactivate lichenin destroying enzymes;
   (b) draining excess moisture from said steamed kernels so that the moisture content of each kernel is about 15% by weight;
   (c) rolling said steamed kernels to a flake form having an average thickness of about .030 inch whereby the several constituent layers of said flakes are in essentially laminar relation;
   (d) impact grinding said flakes to small particle size with discrete starch and non-starch particles;
   (e) screening said discrete particles to separate coarser than 150 mesh size non-starch particles from finer than 150 mesh size starch particles; and
   (f) separating the coarser than 150 mesh size particles into two fractions according to average sphericity factors by introducing said coarser particles into a confined vortical stream of air, those particles having the lower average sphericity factors being the lichenin-containing constituent.

3. A process for isolating a lichenin-containing constituent from kernels of dehulled barley grain, comprising the steps of:
   (a) treating said kernels to inactivate lichenin-destroying enzymes;
   (b) adding moisture so that the moisture content of each kernel is about 15% by weight;
   (c) rolling said moisturized kernels to a flake form having an average thickness of about .030 inch whereby the several constituent layers of said flakes are in essentially laminar relation;
   (d) grinding said flakes to particles about half of which are finer than 150 mesh size;
   (e) screening said ground particles to separate coarser than 150 mesh size non-starch particles from finer than 150 mesh size starch particles; and
   (f) separating the coarser non-starch particles into two fractions according to average sphericity factors by introducing said coarser particles into a confined vortical stream of air, those particles having the lower average sphericity factors being the lichenin-containing constituent.

4. A process for isolating a lichenin-containing constituent from kernels of dehulled barley grain, comprising the steps of:
   (a) subjecting said kernels to steam at a temperature of 212–225° F. for 6–8 minutes;
   (b) drip draining moisture from said steamed kernels;
   (c) rolling said steamed kernels to a flake form having an average thickness of about .030 inch whereby the several constituent layers of said flakes are in essentially laminar relation;

(d) impact grinding said flakes to small particle size with discrete starch and non-starch particles;

(e) screening said discrete particles to separate coarser than 150 mesh size non-starch particles from finer than 150 mesh size starch particles; and (f) separating the coarser than 150 mesh size particles into two fractions according to average sphericity factors by introducing said coarser particles into a confined vortical stream of air, those particles having the lower average sphericity factors being the lichenin-containing constituent.

References Cited in the file of this patent

UNITED STATES PATENTS

| | | |
|---|---|---|
| 2,355,028 | Musher | Aug. 1, 1944 |
| 2,883,309 | Bernheim | Apr. 21, 1959 |

UNITED STATES PATENT OFFICE
CERTIFICATE OF CORRECTION

Patent No. 3,115,411                              December 24, 1963

Harold L. Shields

It is hereby certified that error appears in the above numbered patent requiring correction and that the said Letters Patent should read as corrected below.

Column 7, line 45, for "3.99" read -- 3.89 --; column 10, list of References Cited, add the following reference:

2,752,097   Lecher-------June 26, 1956

Signed and sealed this 7th day of July 1964.

(SEAL)
Attest:

ERNEST W. SWIDER                             EDWARD J. BRENNER
Attesting Officer                                 Commissioner of Patents